(12) United States Patent
Miyahara et al.

(10) Patent No.: US 11,691,181 B2
(45) Date of Patent: Jul. 4, 2023

(54) ARTICLE SORTING APPARATUS

(71) Applicant: Daifuku Co., Ltd., Osaka (JP)

(72) Inventors: Akira Miyahara, Hinocho (JP);
Makoto Namikawa, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 30 days.

(21) Appl. No.: 17/510,946

(22) Filed: Oct. 26, 2021

(65) Prior Publication Data

US 2022/0126324 A1    Apr. 28, 2022

(30) Foreign Application Priority Data

Oct. 27, 2020    (JP) ................................. 2020-179701

(51) Int. Cl.
| | |
|---|---|
| *B65G 47/84* | (2006.01) |
| *B65G 43/08* | (2006.01) |
| *B07C 3/08* | (2006.01) |
| *B07C 5/36* | (2006.01) |

(52) U.S. Cl.
CPC ................ *B07C 3/08* (2013.01); *B07C 5/36* (2013.01); *B65G 47/844* (2013.01); *B65G 2207/36* (2013.01)

(58) Field of Classification Search
CPC .. B07C 3/08; B07C 5/36; B65G 43/08; B65G 47/844; B65G 2207/36
USPC ............................................. 198/370.02, 749
See application file for complete search history.

(56) References Cited

U.S. PATENT DOCUMENTS

| | | | | |
|---|---|---|---|---|
| 5,967,289 | A * | 10/1999 | Kelsey ................. | B65G 47/844 198/370.02 |
| 7,357,242 | B2 * | 4/2008 | Enomoto .............. | B65G 47/844 198/618 |
| 7,530,441 | B2 * | 5/2009 | Zimmer ............... | B65G 47/844 198/370.02 |
| 8,469,177 | B2 * | 6/2013 | Steenwyk ............ | B65G 47/844 198/370.02 |
| 8,469,178 | B2 * | 6/2013 | Butler .................... | B65G 13/00 198/457.06 |
| 9,457,961 | B2 * | 10/2016 | Green, III ............ | B65G 47/244 |
| 10,196,213 | B2 * | 2/2019 | Axmann ................ | B65G 13/11 |
| 10,913,617 | B1 * | 2/2021 | Roth ....................... | F16B 2/22 |
| 10,926,963 | B1 * | 2/2021 | Saurber, III ......... | B65G 47/766 |
| 11,174,109 | B1 * | 11/2021 | Robbins ............. | B65G 47/5104 |
| 11,511,948 | B2 * | 11/2022 | Robbins ................ | H01H 50/44 |

FOREIGN PATENT DOCUMENTS

JP              201613920 A     1/2016

* cited by examiner

*Primary Examiner* — Douglas A Hess
(74) *Attorney, Agent, or Firm* — The Webb Law Firm

(57) ABSTRACT

An article sorting apparatus includes an article support body, article lateral pushing bodies, a rectilinear-movement guide body, a sliding guide body having a sliding guide surface, and a diverting mechanism. The sliding guide surface is disposed so as to be spaced apart from the diverting mechanism in a main transport direction across a separation region, and the separation region is provided so as to include a contact start region that is a region in the main transport direction where each of the article lateral pushing bodies initially comes into contact with a target article.

5 Claims, 7 Drawing Sheets

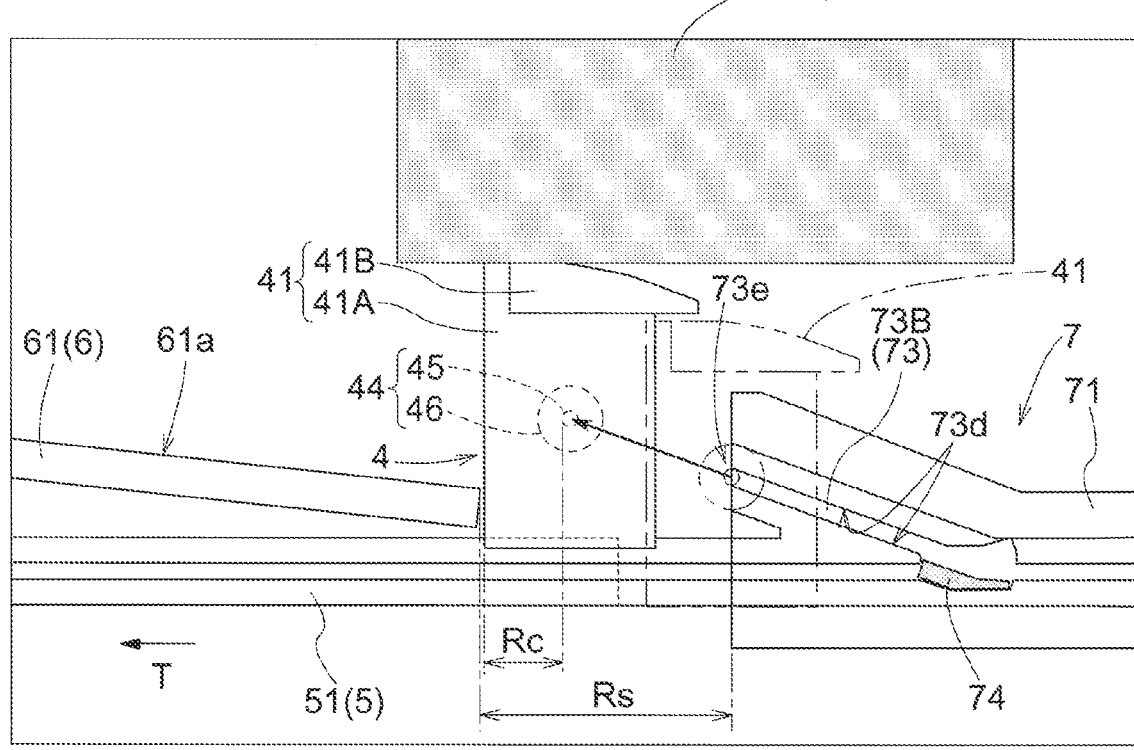
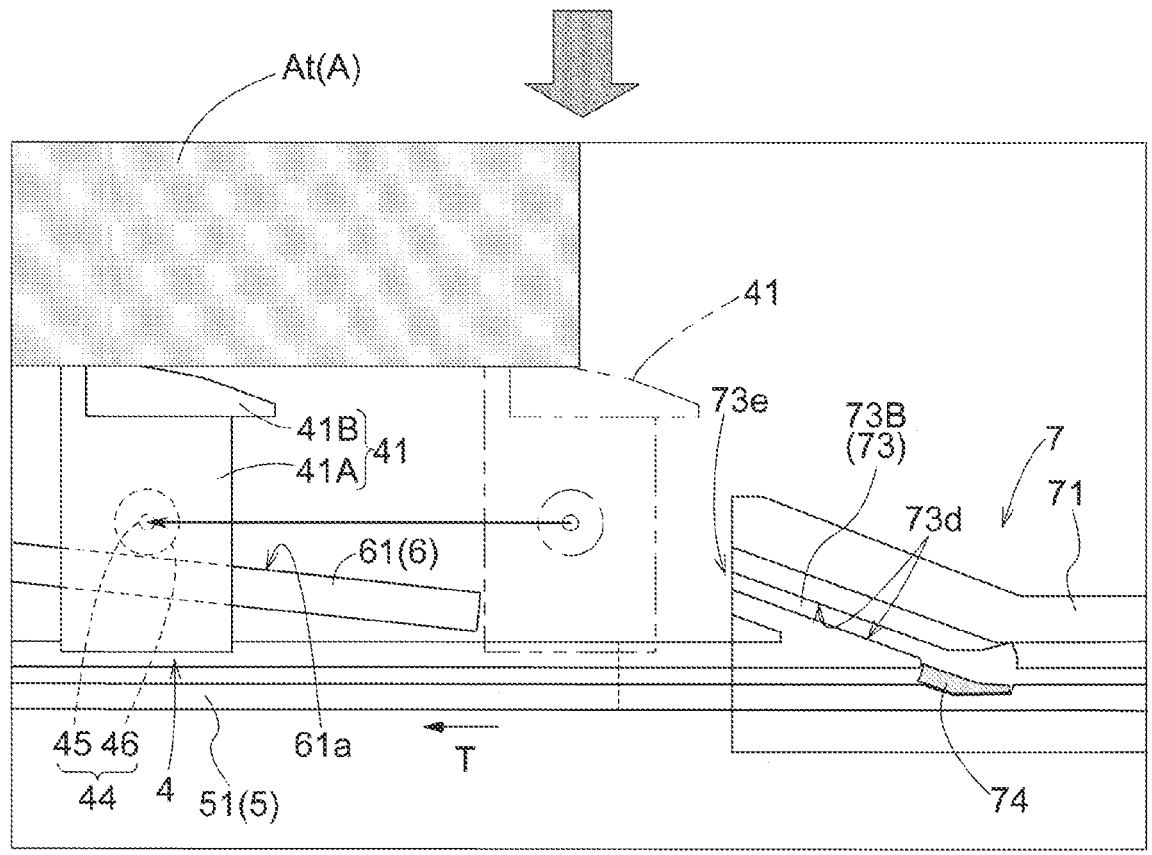
Fig.7

ARTICLE SORTING APPARATUS

CROSS-REFERENCE TO RELATED APPLICATION

The present application claims priority to Japanese Patent Application No. 2020-179701 filed Oct. 27, 2020, the disclosure of which is hereby incorporated by reference in its entirety.

BACKGROUND OF THE INVENTION

1. Field of the Invention

The present invention relates to an article sorting apparatus.

2. Description of the Related Art

In the field of logistics, article sorting apparatuses are used for transporting a plurality of articles having different outer shapes and sizes in a mixed manner, and sorting the articles. An example of such an article sorting apparatus is disclosed in JP 2016-013920A (Patent Document 1). The article sorting apparatus (transport apparatus 1) disclosed in Patent Document 1 includes article support bodies (slats 2) that transport articles along a main transport direction, and article lateral pushing bodies (article pushing shoes 3) provided so as to be slidingly movable relative to the article support bodies along a width direction. In the article sorting apparatus of Patent Document 1, the article lateral pushing bodies are configured such that the sliding movement thereof in the width direction is guided by a sliding guide body (branch guide rail 6).

With the article sorting apparatus of Patent Document 1, the article lateral pushing bodies that slidingly move in the width direction initially come into contact with an article to be sorted, in a region extending from LM1 to LM2 (H1 to H2) shown in FIG. 6 of Patent Document 1 in a state in which the article lateral pushing bodies are guided by the sliding guide body. With such a configuration, the article lateral pushing bodies that move along the main transport direction together with the article support bodies come into contact with the article in a state in which the article lateral pushing bodies receive a reaction force from the sliding guide body. Accordingly, a large load is applied to the sliding guide body during the aforementioned contact. This results in the problem that the article lateral pushing bodies may be damaged, or need to be designed so as to have a high strength in order to prevent such damage.

SUMMARY OF THE INVENTION

For an article sorting apparatus including an article support body that transports an article along a main transport direction, and article lateral pushing bodies provided so as to be slidingly movable relative to the article support body in a width direction, there is a need to reduce the load applied to the article lateral pushing bodies when the article lateral pushing bodies come into contact with the article.

An article sorting apparatus according to the present disclosure includes:

an article support body that forms a transport surface moving along a main transport direction, and that supports an article placed on the transport surface;

a plurality of article lateral pushing bodies disposed so as to be arranged side by side along the main transport direction, each of the article lateral pushing bodies being provided so as to be slidingly movable relative to the article support body in a width direction orthogonal to the main transport direction;

a rectilinear-movement guide body that includes a rectilinear-movement guide surface extending along the main transport direction, and that guides, with the rectilinear-movement guide surface, rectilinear movement of the article lateral pushing bodies along the main transport direction;

a sliding guide body that includes a sliding guide surface extending along an inclined transport direction inclined relative to the main transport direction, and that guides, with the sliding guide surface, the sliding movement of the article lateral pushing body; and a diverting mechanism that is disposed at a branching portion between a rectilinear-movement guide path formed by the rectilinear-movement guide body, and a slide guide path formed by the sliding guide body, and that diverts the article lateral pushing bodies to either a direction toward the rectilinear-movement guide path or a direction toward the slide guide path, wherein an upstream end portion of the sliding guide surface is disposed so as to be spaced apart, in the main transport direction across a separation region, from a downstream end portion of the diverting mechanism on the slide guide path side, and the separation region is provided so as to include a contact start region that is a region in the main transport direction where each of the article lateral pushing bodies initially comes into contact with a target article that is the article to be sorted.

With this configuration, the sliding guide surface of the sliding guide body is disposed so as to be spaced apart from the diverting mechanism in the main transport direction, and each of the article lateral pushing bodies and the target article initially come into contact with each other in the separation region. Therefore, the article lateral pushing body has not yet been guided by the sliding guide body, and initially comes into contact with the target article in a state in which the article lateral pushing body does not receive a reaction force from the sliding guide body. Accordingly, the load applied to an article lateral pushing body when the article lateral pushing body come into contact with the target article can be kept small.

Further features and advantages of the technique according to the present disclosure will become apparent from the following description of illustrative and non-limiting embodiments with reference to the drawings.

BRIEF DESCRIPTION OF THE DRAWINGS

FIG. 7 is a diagram illustrating how an article and an article lateral pushing body initially come into contact with each other.

DETAILED DESCRIPTION OF PREFERRED EMBODIMENTS

An embodiment of an article sorting apparatus will be described with reference to the drawings. An article sorting apparatus 1 is used for transporting a plurality of articles A having different outer shapes and sizes in a mixed manner, and sorting the articles A, for example, in a distribution warehouse. The article sorting apparatus 1 of the present embodiment is formed by a sliding shoe-type slat conveyor.

Figure 1:
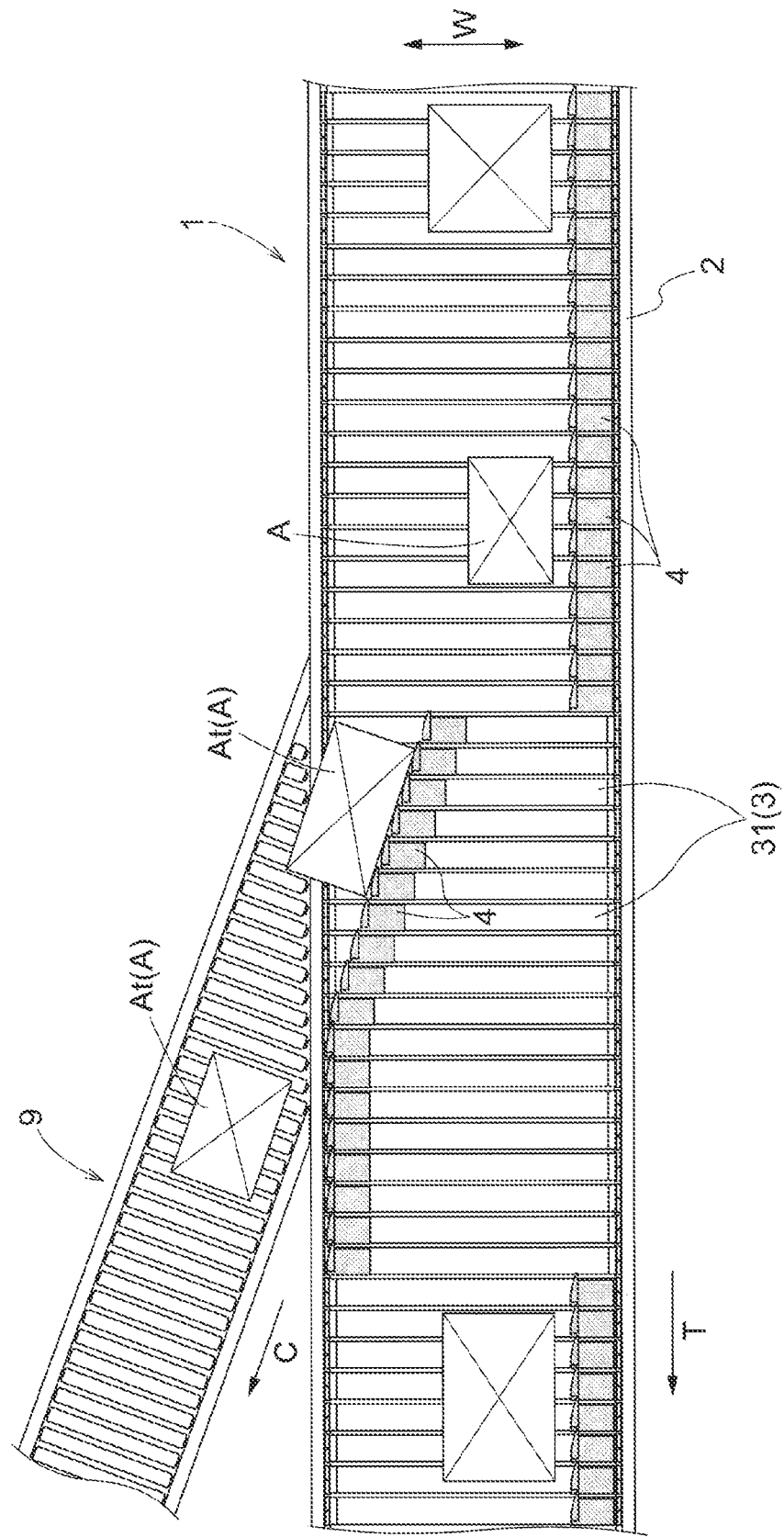
FIG. 1 is a plan view of an article sorting apparatus according to an embodiment.
Figure 2:
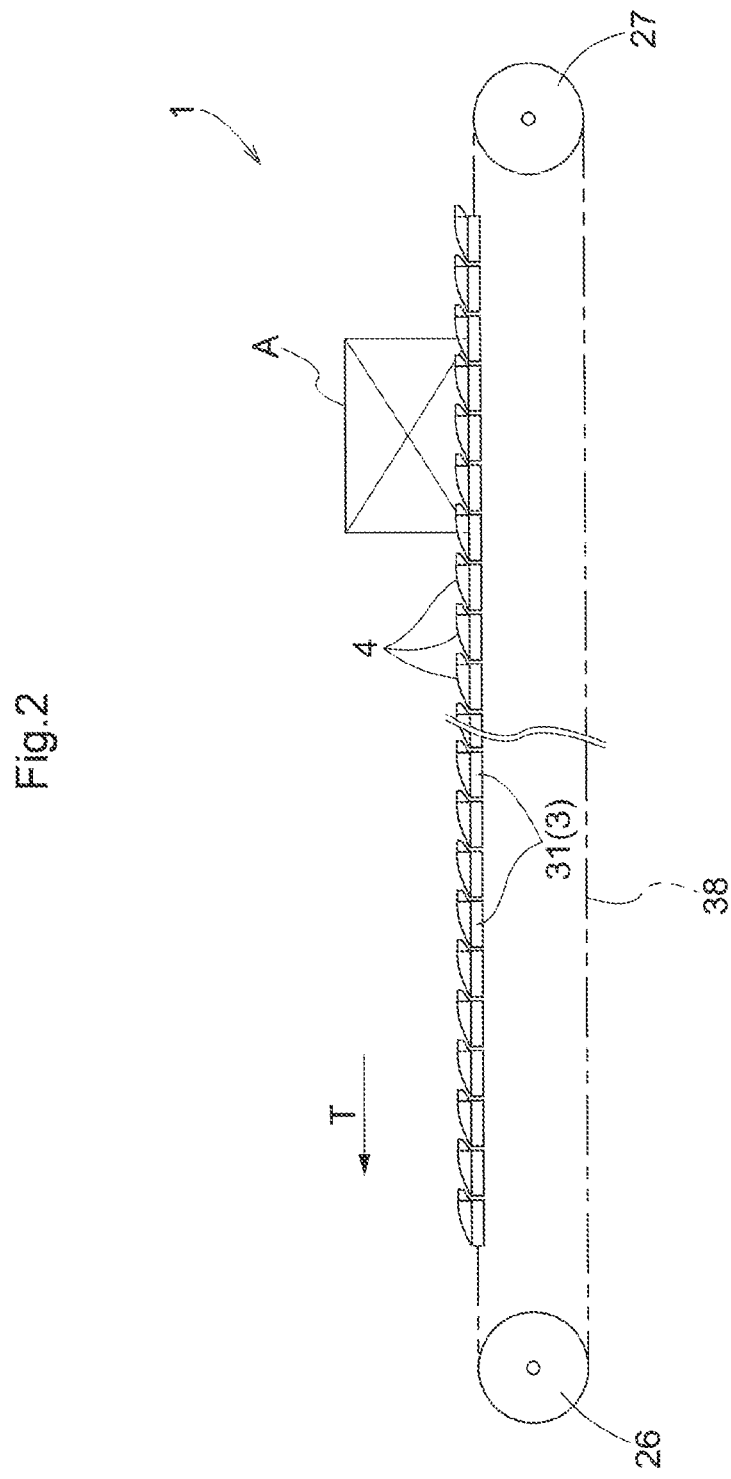
FIG. 2 is a schematic side view of the article sorting apparatus.

As shown in FIGS. 1 and 2, the article sorting apparatus 1 includes a support platform 2, an article support body 3, and article lateral pushing bodies 4. The support platform 2 is disposed along a main transport direction T, which is a direction in which the articles A are transported, and is fixed to a floor surface. The article support body 3 is supported so as to be movable relative to the support platform 2 along the main transport direction T. The article lateral pushing bodies 4 are provided so as to be slidingly movable relative to the article support body 3 in a width direction W that is orthogonal to the main transport direction T.

On one outer side of the article sorting apparatus 1, a branch conveyor 9 is installed along an inclined transport direction C that is inclined relative to the main transport direction T. Note that the inclined transport direction C is a direction inclined outward toward the downstream side of the main transport direction T. The branch conveyor 9 is provided for transporting target articles At out of a plurality of articles A.

Figure 3:
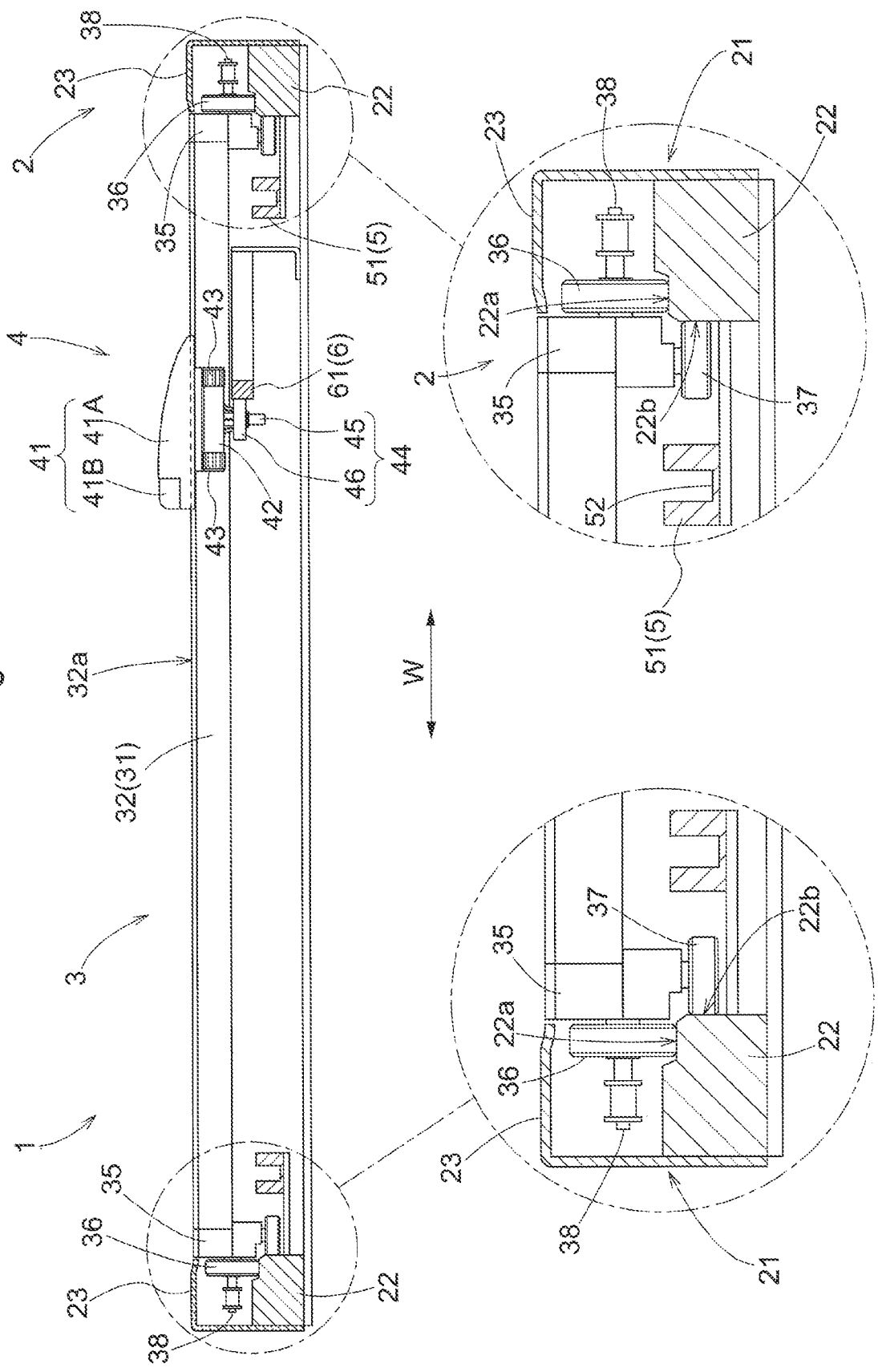
FIG. 3 is a cross-sectional view of the article sorting apparatus.

As shown in FIG. 3, the support platform 2 includes a pair of upper frame bodies 21 disposed on opposite sides in the width direction W. The upper frame bodies 21 form an outward path. A guide rail portion 22 for guiding the movement of the article support body 3 along the main transport direction T is formed on each of the upper frame bodies 21. Each guide rail portion 22 includes an upward facing guide surface 22a and an inward facing guide surface 22b. Moving rollers 36 of the article support body 3 roll on the upward facing guide surfaces 22a. Side rollers 37 of the article support body 3 roll on the inward facing guide surfaces 22b, while abutting thereagainst from the inner side. A cover 23 is fixed to each of the upper frame bodies 21 so as to cover the moving roller 36 and an endless chain 38 of the article support body 3 from outward and upward.

Although not shown, the support platform 2 further includes, below the upper frame bodies 21, a pair of lower frame bodies for forming a return path, and a coupling member that couples the upper frame bodies 21 to the lower frame bodies.

A driving sprocket 26 and a driven sprocket 27 (see FIG. 2) around which the endless chain 38 of the article support body 3 is wrapped are each rotatably supported by the support platform 2. Note that the driving sprocket 26 is driven to rotate by the driving force of a driving motor. The driven sprocket 27 rotates in conjunction with the driving sprocket 26 via the endless chain 38.

The article support body 3 includes a plurality of plate-shaped support members 31. For example, slats can be used as the plate-shaped support members 31. The plurality of plate-shaped support members 31 are disposed so as to be arranged side by side along the main transport direction T, and are fixed to the endless chain 38 (see FIG. 2) that circulates along the main transport direction T. Accordingly, the plurality of plate-shaped support members 31 constituting the article support body 3 circulate along the main transport direction T in conjunction with the rotation of the driving sprocket 26 via the endless chain 38.

Figure 4:
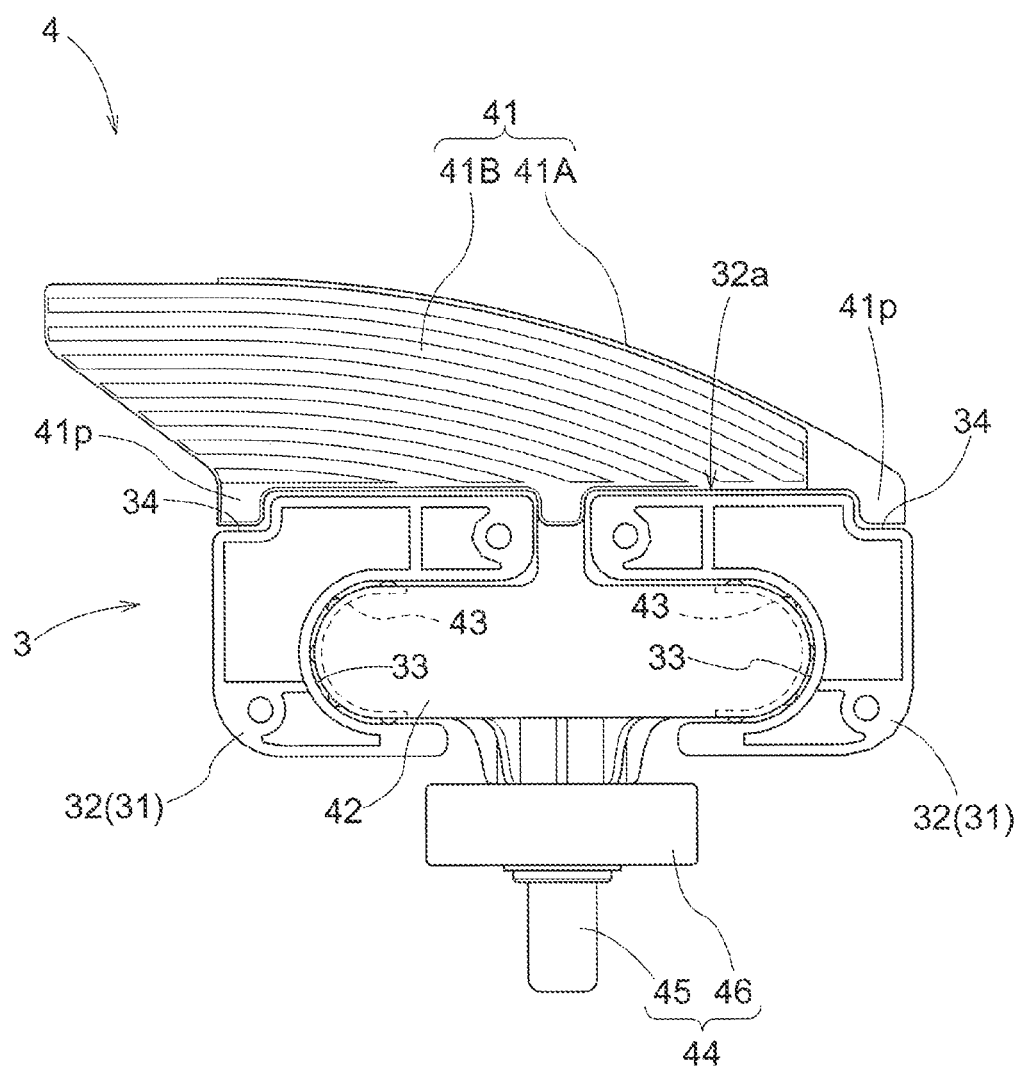
FIG. 4 is a diagram showing a state in which an article support body and an article lateral pushing body are mounted to each other.

As shown in FIG. 4, each of the plate-shaped support members 31 includes a pair of support frame bodies 32. The pair of support frame bodies 32 are disposed so as to be opposed to each other with a slight gap therebetween in the main transport direction T. The upper surface of each support frame 32 serves as a placement surface 32a on which an article A is to be placed. An assembly of the respective placement surfaces 32a of the plurality of plate-shaped support members 31 disposed in parallel along the main transport direction T constitutes a "transport surface" that moves along the main transport direction T. Also, the article support body 3 transports the article A placed on the placement surfaces 32a along the main transport direction T, while supporting the article A from below.

Each support frame 32 has a curved recess 33 and a corner groove portion 34. The curved recess 33 and the corner groove portion 34 are formed continuously in the longitudinal direction (the width direction W) so as to each have a uniform cross-sectional shape as viewed in the longitudinal direction (the width direction W of the article sorting apparatus 1) of the support frame 32. The respective curved recesses 33 of the pair of support frame bodies 32 are formed so as to be opposed to each other. Also, the slide body 42 of each article lateral pushing body 4 is slidably housed so as to span between the two curved recesses 33. The respective corner groove portions 34 of the pair of support frame bodies 32 are formed at corner portions of the placement surfaces 32a that are opposite to each other (an upstream corner portion of the support frame 32 on the upstream side in the main transport direction T/a downstream corner portion of the support frame 32 on the downstream side in the main transport direction T). A downward protruding portion 41p formed at the contact portion 41 of the article lateral pushing body 4 is disposed on each of the corner groove portions 34.

The pair of support frame bodies 32 are coupled to each other by coupling bodies 35. As shown in FIG. 3, a pair of coupling bodies 35 are provided so as to couple the pair of support frame bodies 32 on opposite sides in the width direction W. A moving roller 36 is supported on each of the coupling bodies 35 so as to be rotatable about a rotation axis extending along the width direction W. Also, a side roller 37 is supported on the coupling body 35 so as to be rotatable about a rotation axis extending along the up-down direction. When each plate-shaped support member 31 moves along the main transport direction T, the moving roller 36 rolls on the upward facing guide surface 22a of the guide rail portion 22, and the side roller 37 rolls on the inward facing guide surface 22b of the guide rail portion 22, while coming into contact therewith from the inner side.

The endless chain 38 is fixed to the coupling bodies 35. The endless chain 38 is coupled to the rotation axes of the moving rollers 36. In the present embodiment, the endless chain 38 corresponds to an "endless rotating body".

A plurality of the article lateral pushing bodies 4 are disposed so as to be arranged side by side along the main transport direction T, and each of the article lateral pushing bodies 4 is provided so as to be slidingly movable relative to the article support body 3 in the width direction W orthogonal to the main transport direction T. In the present embodiment, each of the plurality of articles lateral pushing bodies 4 is attached to the corresponding one of the plate-shaped support members 31 so as to be slidingly movable in the width direction W. As shown in FIGS. 3 and 4, the article lateral pushing bodies 4 each include a contact portion 41, a slide body 42, and a guided portion 44.

The contact portion 41 is a portion coming into contact with a target article At that is an article A to be sorted, of the plurality of articles A. The contact portion 41 is disposed above the article support body 3, and slidingly moves in the width direction W so as to come into contact with the target article At placed on the article support body 3. The contact portion 41 includes a block-like contact main body portion 41A formed in a predetermined shape, and a dampening member 41B fixed to the contact main body portion 41A. The contact main body portion 41A is formed in a rectangular shape in a plan view. The contact main body portion 41A has an upper surface that is inclined so as to be gradually elevated from the downstream side toward the upstream side in the main transport direction T, and to be gradually elevated from a side opposite to the branch conveyor 9 in the width direction W toward the branch conveyor 9 side. The dampening member 41B is made of a rubber, urethane, or the like, for example. The dampening member 41B is fixed to a side surface of the contact main body portion 41A on the branch conveyor 9 side, and reduces the impact generated when initially coming into contact with the target article At.

In the present embodiment, a downward protruding portion 41p protruding downward is formed on the contact portion 41. The downward protruding portion 41p is disposed so as to enter from above the corner groove portion 34 formed on the plate-shaped support member 31. The downward protruding portion 41p functions as a scraper, and can laterally push the target article At in a favorable manner even when the target article At is thin.

The slide body 42 is coupled to the contact portion 41, and is disposed below the contact portion 41. The slide body 42 is disposed so as to span between the mutually opposed curved recesses 33 of the pair of support frame bodies 32 constituting the plate-shaped support member 31. Also, the surface of the slide body 42 is disposed so as to be opposed to the surfaces of the curved recesses 33. A slider 43 having a plurality of protrusions on the surface thereof is disposed on a portion of the slide body 42 that is opposed to each of the curved recesses 33. As the slider 43, it is possible to use, for example, a resin slider made of a resin such as an ultrahigh molecular weight polyethylene. The slide body 42 is smoothly slidable relative to the plate-shaped support member 31, because the sliding resistance is reduced as a result of only the protrusions of the sliders 43 coming into contact with the plate-shaped support member 31 (support frame 32).

Note that, in place of the slider 43, for example, a bearing or the like may be provided on each of the portions where the slide body 42 and the curved recesses 33 are opposed to each other.

The guided portion 44 is coupled to the slide body 42, and is disposed below the slide body 42. The guided portion 44 includes a support shaft 45 fixed to the contact portion 41 via the slide body 42, and a roller 46 that is supported so as to be rotatable relative to the support shaft 45. The support shaft 45 extends through the roller 46, and protrudes below the roller 46. The support shaft 45 is guided along a rectilinear-movement guide surface 52a of a rectilinear-movement guide body 5 when the article lateral pushing body 4 rectilinearly move along the main transport direction T. The support shaft 45 is guided along guide surfaces 73c and 73d of a diverting mechanism 7 when the advancing direction of the article lateral pushing body 4 is switched by the diverting mechanism 7. The roller 46 is guided along a sliding guide surface 61a of the sliding guide body 6 when the article lateral pushing body 4 slidingly moves relative to the article support body 3 in the width direction W.

Figure 5:
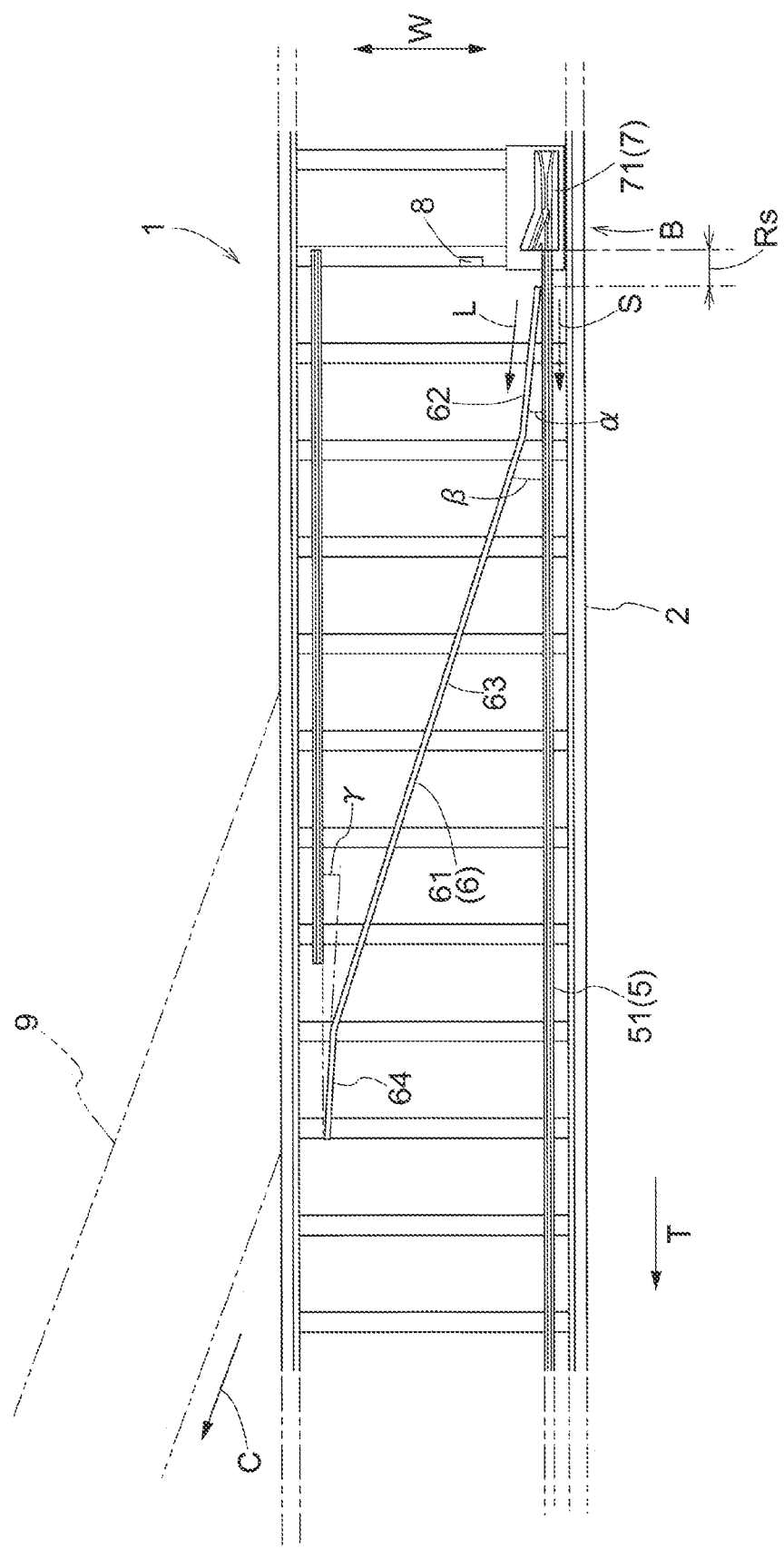
FIG. 5 is a diagram showing an arrangement of a rectilinear-movement guide body and a sliding guide body.

As shown in FIG. 5, the article sorting apparatus 1 further includes a rectilinear-movement guide body 5, a sliding guide body 6, and a diverting mechanism 7. All of the rectilinear-movement guide body 5, the sliding guide body 6, and the diverting mechanism 7 are fixed to the support platform 2.

Figure 6:
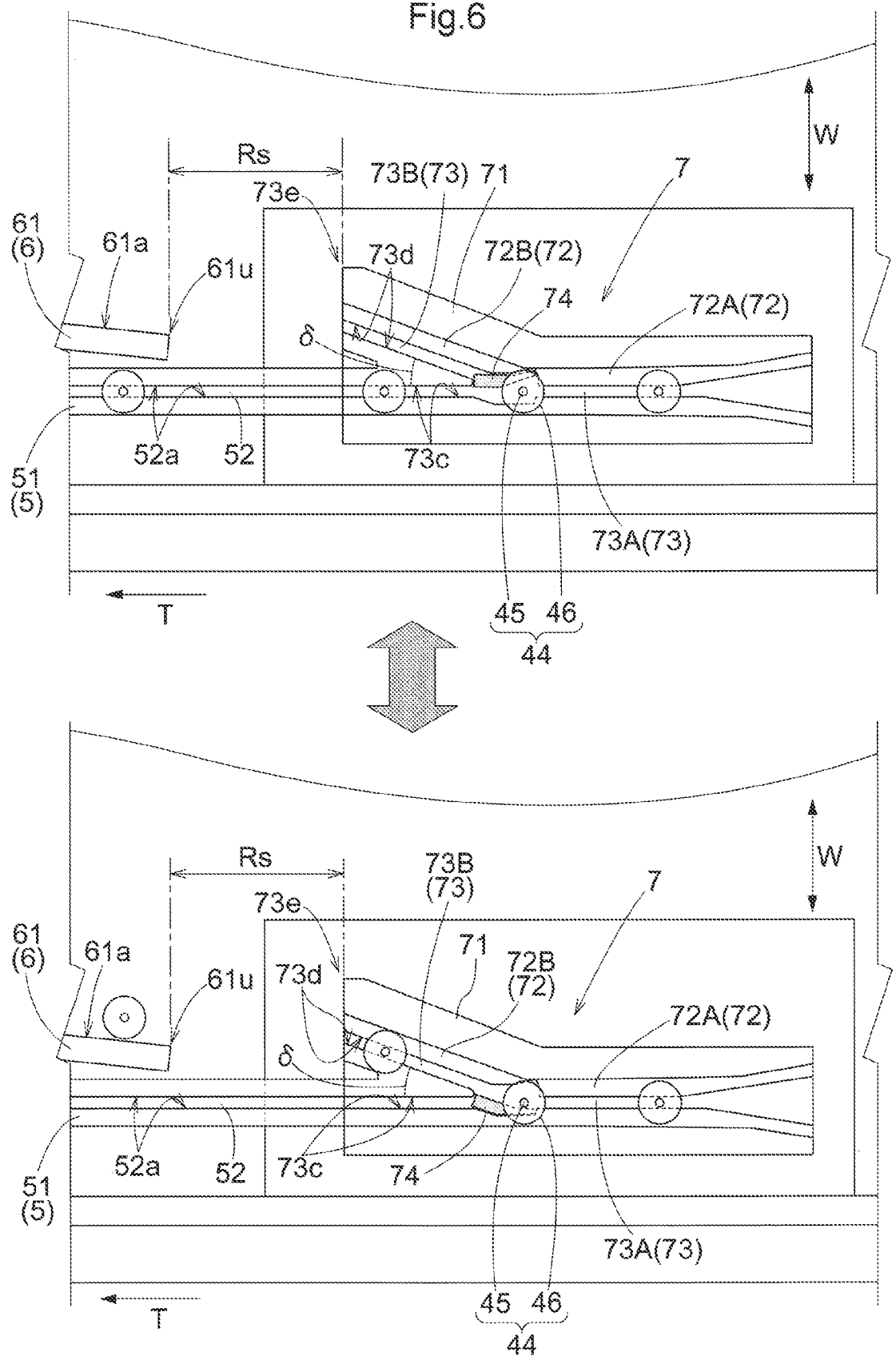
FIG. 6 is a diagram illustrating a function of a diverting mechanism.

The rectilinear-movement guide body 5 guides rectilinear movement of the article lateral pushing bodies 4 along the main transport direction T. As shown in FIG. 6, the rectilinear-movement guide body 5 includes a rectilinear-movement guide surface 52a extending along the main transport direction T. The rectilinear-movement guide body 5 guides, with the rectilinear-movement guide surface 52a, rectilinear movement of the article lateral pushing bodies 4 along the main transport direction T. In the present embodiment, the rectilinear-movement guide body 5 includes a rectilinear-movement guide rail 51 provided along the main transport direction T. A groove portion 52 having a width slightly larger than the outer diameter of the support shaft 45 of each article lateral pushing body 4 is formed on the upper surface of the rectilinear-movement guide rail 51. A lower end portion of the support shaft 45 of the article lateral pushing body 4 enters the groove portion 52. Also, a side wall surface of the groove portion 52 functions as the rectilinear-movement guide surface 52a, and the rectilinear-movement guide surface 52a is configured to guide the support shaft 45. Thus, as a result of the support shaft 45 moving along the rectilinear-movement guide surface 52a, each article lateral pushing body 4 rectilinearly moves along the main transport direction T. In the following, a guide path formed by the rectilinear-movement guide body 5 will be referred to as a "rectilinear-movement guide path S".

The sliding guide body 6 guides sliding movement of the article lateral pushing bodies 4 relative to the article support body 3. As shown in FIG. 6, the sliding guide body 6 includes a sliding guide surface 61a extending along an inclined transport direction C inclined relative to the main transport direction T, and guides, with the sliding guide surface 61a, sliding movement of the article lateral pushing bodies 4. In the present embodiment, the sliding guide body 6 includes an oblique guide rail 61 extending along the inclined transport direction C. The oblique guide rail 61 is installed at the same height position as the rollers 46 of the article lateral pushing bodies 4. Also, a side surface of the oblique guide rail 61 that is located on the branch conveyor 9 side functions as the sliding guide surface 61a, and the sliding guide surface 61a is configured to guide the rollers 46. In the following, a guide path formed by the sliding guide body 6 will be referred to as a "slide guide path L".

The oblique guide rail 61 includes a plurality of portions having mutually different angles of inclination relative to the rectilinear-movement guide rail 51 (the main transport direction T). In the present embodiment, the oblique guide rail 61 includes three portions, namely, a first rail portion 62, a second rail portion 63, and a third rail portion 64. When the angle of inclination of the first rail portion 62 relative to the rectilinear-movement guide rail 51 (the main transport direction T) is a first angle $\alpha$, the angle of inclination of the second rail portion 63 is a second angle $\beta$, and the angle of inclination of the third rail portion 64 is a third angle $\gamma$, the first angle $\alpha$ is larger than the third angle $\gamma$, and, further, the second angle $\beta$ is larger than the first angle $\alpha$. For example, the first angle $\alpha$ is preferably an angle set between 3° to 15°, the second angle β is preferably an angle set between 15° to 25°, and the third angle γ is preferably an angle set between 0° to 5°.

Note that, when the oblique guide rail 61 is formed into a bent line in this manner, the "inclined transport direction C" represents an overall direction, and the "slide guide path L" also represents an overall path. Since the oblique guide rail 61 constitutes a path that eventually causes the article lateral pushing bodies 4 to move toward the branch conveyor 9, the extension direction of the branch conveyor 9, for example, may be regarded as the inclined transport direction C.

As shown in FIG. 5, the diverting mechanism 7 is disposed at a branching portion B between the rectilinear-movement guide path S and the slide guide path L. The diverting mechanism 7 diverts the article lateral pushing bodies 4 to either a direction toward the rectilinear-movement guide path S or a direction toward the slide guide path L.

As shown in FIG. 6, the diverting mechanism 7 according to the present embodiment includes a block body 71. A groove portion having a two-step depth is formed on the upper surface of the block body 71. Specifically, a shallow groove portion 72 is formed on the upper surface of the block body 71, and a deep-groove portion 73 is formed on the bottom surface of the shallow groove portion 72. Except for an upstream end portion thereof, the shallow groove portion 72 is formed to have a width slightly larger than the outer diameter of the roller 46 of each article lateral pushing body 4. Except for an upstream end portion thereof, the deep-groove portion 73 is formed to have a width slightly larger than the outer diameter of the support shaft 45 of the article lateral pushing body 4. The roller 46 of the article lateral pushing body 4 passes through the shallow groove portion 72, and the support shaft 45 of the article lateral pushing body 4 passes through the deep-groove portion 73.

The upstream end portions of the shallow groove portion 72 and the deep-groove portion 73 each have a large width, and are formed such that the width gradually decreases toward the downstream side. By doing so, the article lateral pushing bodies 4 that have reached the diverting mechanism 7 can be aligned.

The shallow groove portion 72 includes a rectilinear-movement shallow groove portion 72A formed along the main transport direction T, and a branched shallow groove portion 72B branched from the rectilinear-movement shallow groove portion 72A. Similarly, the deep-groove portion 73 includes a rectilinear-movement deep groove portion 73A formed along the main transport direction T, and a branched deep groove portion 73B branched from the rectilinear-movement deep groove portion 73A. When the angle of inclination of the branched shallow groove portion 72B relative to the rectilinear-movement deep groove portion 73A is a fourth angle δ, the fourth angle δ is set to be larger than the first angle α. Note that the magnitude of the fourth angle δ may be comparable to that of the second angle β. The fourth angle δ is preferably an angle set between, for example, 15° to 30°, and is more preferably 20° to 30°.

Further, a swing member 74 is provided at a branching point between the rectilinear-movement deep groove portion 73A and the branched deep groove portion 73B. The swing member 74 is driven by a driving portion including, for example, a rotary solenoid, and swings using a downstream end thereof as a fulcrum.

As shown in the upper section in FIG. 6, when the swing member 74 swings so as to be located on the branched deep groove portion 73B side, the support shaft 45 of the article lateral pushing body 4 advancing inside the rectilinear-movement deep groove portion 73A keeps advancing inside the rectilinear-movement deep groove portion 73A. At this time, a side wall surface of the rectilinear-movement deep groove portion 73A functions as a rectilinear-movement guide surface 73*c*, and the rectilinear-movement guide surface 73*c* is configured to guide the support shaft 45. On the other hand, as shown in the lower section in FIG. 6, when the swing member 74 swings so as to be located on the rectilinear-movement deep groove portion 73A side, the advancing direction of the support shaft 45 of the article lateral pushing body 4 advancing inside the rectilinear-movement deep groove portion 73A is changed by the swing member 74, and thereafter the support shaft 45 advances inside the branched deep groove portion 73B. At this time, a side wall surface of the branched deep groove portion 73B functions as a branching guide surface 73*d*, and the branching guide surface 73*d* is configured to guide the support shaft 45. In the present embodiment, the rectilinear-movement guide surface 73*c* and the branching guide surface 73*d* (in particular, the branching guide surface 73*d*) correspond to a "diverting guide surface".

Thus, the diverting mechanism 7 diverts the support shaft 45 either to the rectilinear-movement deep groove portion 73A or the branched deep groove portion 73B by causing the swing member 74 to swing, thereby diverting the article lateral pushing body 4 either to a direction toward the rectilinear-movement guide path S or a direction toward the slide guide path L.

In the article sorting apparatus 1 according to the present embodiment, the rectilinear-movement guide body 5 is disposed adjacent to the diverting mechanism 7 in the main transport direction T. Specifically, the rectilinear-movement guide rail 51 constituting the rectilinear-movement guide body 5 is disposed abutting against the block body 71 constituting the diverting mechanism 7. At this time, the block body 71 and the rectilinear-movement guide rail 51 are installed such that the groove portion 52 formed on the rectilinear-movement guide rail 51, and the rectilinear-movement deep groove portion 73A formed on the block body 71 are directly continuous along the main transport direction T. Accordingly, the rectilinear-movement guide surface 73*c* formed by the side wall surface of the rectilinear-movement deep groove portion 73A of the diverting mechanism 7, and the rectilinear-movement guide surface 52*a* formed by the side wall surface of the groove portion 52 of the rectilinear-movement guide body 5 extend continuously in the form of a straight line.

The sliding guide body 6 is disposed so as to be spaced apart from the diverting mechanism 7 in the main transport direction T. Specifically, the oblique guide rail 61 constituting the sliding guide body 6 is disposed so as to be spaced apart from the block body 71 constituting the diverting mechanism 7. At this time, an upstream end portion 61*u* of the sliding guide surface 61*a* formed by the side surface of the oblique guide rail 61 is disposed so as to be spaced apart, in the main transport direction T across a separation region Rs, from a downstream end portion 73*e* of the branching guide surface 73*d* formed by the side wall surface of the branched deep groove portion 73B formed on the block body 71.

Here, as shown in the upper section in FIG. 7, the separation region Rs between the diverting mechanism 7 and the sliding guide body 6 is set so as to include a contact start region Rc. The contact start region Rc is a region in the main transport direction T where the article lateral pushing bodies 4 initially come into contact with the target article At that is an article A to be sorted. By doing so, the article lateral pushing bodies 4 that have been released from the downstream end portion 73e of the branched deep groove portion 73B of the diverting mechanism 7 advance by inertia along the extension direction of the branched deep groove portion 73B. Then, in the separation region Rs, the article lateral pushing bodies 4 initially come into contact with the target article At that is the article A to be sorted, in a state in which the article lateral pushing bodies 4 have not yet been guided by the sliding guide body 6.

Each article lateral pushing body 4 does not receive a reaction force from the sliding guide body 6 in a state in which the roller 46 thereof has not yet been guided by the sliding guide body 6. By causing the article lateral pushing body 4 to initially come into contact with the target article At (hereinafter referred to as "guideless contact") in this state, the load applied to the article lateral pushing body 4 during contact can be kept small, since the article lateral pushing body 4 does not receive a reaction force from the sliding guide body 6. Through guideless contact, the load applied during contact with the target article At is applied to the entire article lateral pushing body 4, thus preventing the load from being concentrated on the guided portion 44. Accordingly, the load applied to the article lateral pushing body 4 during contact can be kept small in this respect as well.

Also for the target article At, the impact exerted on the target article At during the initial contact between the article lateral pushing body 4 and the target article At can be kept small. Accordingly, the orientation of the target article At during the initial contact can be stabilized. In particular, the target article At hardly rotates when coming into contact with the article lateral pushing body 4. Such an advantage is particularly useful in sorting elongated target article At which is elongate in the main transport direction T. If an elongated target article At rotates when an article lateral pushing body 4 and the target article At initially come into contact with each other, the rear end side of the target article At may come into contact with the subsequent article lateral pushing body 4. At this time, if that article lateral pushing body 4 still remains inside the diverting mechanism 7, the article lateral pushing body 4 is pressed by the rotating target article At, and a large load may act on the support shaft 45 of the article lateral pushing body 4. In this respect, according to the present embodiment, the rotation of the target article At can be suppressed through guideless contact, and it is therefore possible to prevent a large load from acting on the support shaft 45, thus effectively preventing a situation where the support shaft 45 may be damaged.

The article lateral pushing body 4 whose contact portion 41 has initially come into contact with the target article At in the separation region Rs thereafter moves to the downstream side in a parallel manner along the main transport direction T together with the target article At, as shown in the lower section in FIG. 7. The parallel movement of the article lateral pushing body 4 along the main transport direction T continues until the roller 46 of the article lateral pushing body 4 comes into contact with the sliding guide body 6. Thus, the sliding guide body 6 (sliding guide surface 61a) is disposed such that the guided portion 44 comes into contact with the sliding guide surface 61a when the contact portion 41 of the article lateral pushing body 4 moves parallel to the main transport direction T from the position at which the contact portion 41 has initially come into contact with the target article At. Then, after the outer surface of the roller 46 has come into contact with the sliding guide surface 61a of the sliding guide body 6, the article lateral pushing body 4 slidingly moves relative to the article support body 3 in the width direction W as the roller 46 rolls on the sliding guide surface 61a. Through the sliding movement of the article lateral pushing body 4, the target article At pushed by the article lateral pushing body 4 is fed to the branch conveyor 9 (see FIG. 1).

In order for a target article At transported along the main transport direction T to be fed to the slide guide path L side (branch conveyor 9 side), it is necessary to appropriately determine which of the plurality of plate-shaped support members 31 constituting the article support body 3 is passing through the diverting mechanism 7 (in particular, the position of the swing member 74). For this purpose, the article sorting apparatus 1 further includes a passage sensor 8 that detects that each of the article lateral pushing bodies 4 has passed through the diverting mechanism 7 (see FIG. 5).

As the passage sensor 8, it is possible to use, for example, a transmissive or reflective photoelectric sensor. The passage sensor 8 performs a detection operation on the support shaft 45 of the article lateral pushing body 4, and detects passage of the support shaft 45. In the present embodiment, the passage sensor 8 uses the separation region Rs between the diverting mechanism 7 and the sliding guide body 6, and is installed in the separation region Rs. Also, the passage sensor 8 is installed so as to detect the article lateral pushing body 4 (the support shaft 45) in the separation region Rs. Specifically, the passage sensor 8 is installed such that the region in which the article lateral pushing body 4 (support shaft 45) is detected by the passage sensor 8 is located in the separation region Rs. For example, when the passage sensor 8 is a transmissive or reflective photoelectric sensor, the passage sensor 8 is installed such that the path of light emitted from the sensor passes through the separation region Rs. By doing so, it is possible to detect the support shaft 45 of the article lateral pushing body 4 by the passage sensor 8, without separately forming a slit or a cut-out portion in the sliding guide body 6. Accordingly, it is possible to simplify the configuration for detecting passage of the article lateral pushing body 4.

Other Embodiments (1) In the above embodiment, an exemplary configuration is described in which the article support body 3 includes a plurality of plate-shaped support members 31 (specifically, slats). However, the present disclosure is not limited to such a configuration, and the article support body 3 may be formed by a plurality of tubular support members (pipes), for example. Alternatively, the article support body 3 may be formed by an endless belt.

(2) In the above embodiment, an exemplary configuration is described in which the article lateral pushing bodies 4 are slidable relative to the individual plate-shaped support members 31 constituting the article support body 3, and thus are slidable in the width direction W. However, the present disclosure is not limited to such a configuration, and the article lateral pushing bodies 4 may be slidable in a direction inclined relative to the width direction W when the article support body 3 is formed by an endless belt, for example. In this way, the article lateral pushing bodies 4 need only include a component that moves in at least the width direction W during sliding movement.

(3) In the above embodiment, an exemplary configuration is described in which each of the article lateral pushing bodies 4 is slidable in a state in which the article lateral pushing body 4 is housed between the two support frame bodies 32 constituting the plate-shaped support member 31. However, the present disclosure is not limited to such a configuration, and any sliding structure may be adopted as the sliding structure of the article lateral pushing body 4 relative to the article support body 3. For example, each of the article lateral pushing bodies 4 may be slidable in a state in which the article lateral pushing body 4 is externally fitted to the plate-shaped support member 31.

(4) In the above embodiment, an exemplary configuration is described in which the sliding guide body 6 (oblique guide rail 61) includes three portions having mutually different angles of inclination. However, the present disclosure is not limited to such a configuration, and the number of portions having mutually different angles of inclination may be two, or four or more. The sliding guide body 6 (oblique guide rail 61) may include, in at least a portion thereof (e.g., portions corresponding to the first rail portion 62 and the second rail portion 63 in the above-described embodiment), a curved portion such as an arcuate portion.

(5) In the above embodiment, an exemplary configuration is described in which the entire side surface of the sliding guide body 6 (oblique guide rail 61) constitutes the sliding guide surface 61a, and the entire sliding guide body 6 (oblique guide rail 61) is disposed so as to be spaced apart from the diverting mechanism 7 in the main transport direction T. However, the present disclosure is not limited to such a configuration, and the sliding guide body 6 (oblique guide rail 61) may have a non-guide surface that does not guide the article lateral pushing bodies 4, other than the sliding guide surface 61a. In such a case, the sliding guide body 6 (oblique guide rail 61) itself may be disposed adjacent to (and furthermore, continuous with) the diverting mechanism 7 as long as at least the sliding guide surface 61a and the diverting mechanism 7 are spaced apart from each other in the main transport direction T.

(6) In the above embodiment, an exemplary configuration is described in which the separation region Rs between the diverting mechanism 7 and the sliding guide body 6 is provided so as to completely include the contact start region Rc. However, the present disclosure is not limited to such a configuration, and the separation region Rs may include at least a portion of the contact start region Rc as long as the initial contact between the article lateral pushing bodies 4 and the target article At is achieved through guideless contact.

(7) In the above embodiment, an exemplary configuration is described in which the diverting mechanism 7 includes a swingable swing member 74, and mechanically diverts the advancing direction of the article lateral pushing bodies 4. However, the present disclosure is not limited to such a configuration. For example, the advancing direction of the article lateral pushing bodies 4 may be electromagnetically diverted by forming the support shaft 45 of each of the article lateral pushing bodies 4 by a ferromagnetic material, and providing the diverting mechanism 7 with an electromagnet and permanent magnet.

(8) In the above embodiment, an exemplary configuration is described in which the passage sensor 8 is formed by a photoelectric sensor, and the passage sensor 8 is installed in the separation region Rs between the diverting mechanism 7 and the sliding guide body 6. However, the present disclosure is not limited to such a configuration, and a passage sensor using any detection principle may be used as the passage sensor 8 as long as the passage sensor can detect that each of the article lateral pushing bodies 4 has passed through at least the diverting mechanism 7. For example, the passage sensor 8 may be a contact-type sensor, a switch, a camera, or the like. The passage sensor 8 need not necessarily be installed in the separation region Rs.

(9) The configurations disclosed in the embodiments described above (including the above-described embodiment and other embodiments; the same applies to the following) are applicable in combination with configurations disclosed in other embodiments so long as no inconsistency arises. With regard to the other configurations as well, the embodiments disclosed herein are in all respects as illustrative, and appropriate changes and modifications may be made thereto without departing from the scope and sprit of the present disclosure.

Outline of the Embodiment

To summarize the foregoing, preferably, an article sorting apparatus according to the present disclosure includes the following configurations.

An article sorting apparatus including:

an article support body that forms a transport surface moving along a main transport direction, and that supports an article placed on the transport surface;

a plurality of article lateral pushing bodies disposed so as to be arranged side by side along the main transport direction, each of the article lateral pushing bodies being provided so as to be slidingly movable relative to the article support body in a width direction orthogonal to the main transport direction;

a rectilinear-movement guide body that includes a rectilinear-movement guide surface extending along the main transport direction, and that guides, with the rectilinear-movement guide surface, rectilinear movement of the article lateral pushing bodies along the main transport direction;

a sliding guide body that includes a sliding guide surface extending along an inclined transport direction inclined relative to the main transport direction, and that guides, with the sliding guide surface, the sliding movement of the article lateral pushing body; and a diverting mechanism that is disposed at a branching portion between a rectilinear-movement guide path formed by the rectilinear-movement guide body, and a slide guide path formed by the sliding guide body, and that diverts the article lateral pushing bodies to either a direction toward the rectilinear-movement guide path or a direction toward the slide guide path, wherein an upstream end portion of the sliding guide surface is disposed so as to be spaced apart, in the main transport direction across a separation region, from a downstream end portion of the diverting mechanism on the slide guide path side, and the separation region is provided so as to include a contact start region that is a region in the main transport direction where each of the article lateral pushing bodies initially comes into contact with a target article that is the article to be sorted.

With this configuration, the sliding guide surface of the sliding guide body is disposed so as to be spaced apart from the diverting mechanism in the main transport direction, and each of the article lateral pushing bodies and the target article initially come into contact with each other in the separation region. Therefore, the article lateral pushing body has not yet been guided by the sliding guide body, and initially comes into contact with the target article in a state in which the article lateral pushing body does not receive a reaction force from the sliding guide body. Accordingly, the load applied to an article lateral pushing body when the article lateral pushing body come into contact with the target article can be kept small.

As an aspect, it is preferable that the article lateral pushing bodies each include a contact portion coming into contact with the target article, and a guided portion that is supported by the contact portion and is guided along the sliding guide surface, and the sliding guide surface is disposed such that the guided portion comes into contact with the sliding guide surface when the contact portion of each of the article lateral pushing bodies moves parallel to the main transport direction from a position at which the contact portion has initially come into contact with the target article.

With this configuration, it is possible to appropriately achieve a configuration in which each of the article lateral pushing bodies initially comes into contact with the target article in a state in which the article lateral pushing body has not yet been guided by the sliding guide body. After the article lateral pushing body has come into contact with the target article, the guided portion is received by the sliding guide surface, and the sliding movement of the article lateral pushing body in the width direction can be appropriately guided.

As an aspect, it is preferable that the guided portion the guided portion includes a support shaft fixed to the contact portion, and a roller supported so as to be rotatable relative to the support shaft, the diverting mechanism includes a diverting guide surface that guides the support shaft, and the sliding guide surface is configured to guide the roller.

With this configuration, the displacement between the diverting guide surface and the sliding guide surface that corresponds to the difference in outer diameter between the support shaft and the roller can be absorbed using the separation region. That is, by using the separation region, it is possible to achieve a configuration for switching the article sorting apparatus from a state in which the support shaft is guided by the diverting guide surface to a state in which the roller having a wider diameter than the support shaft is guided by the sliding guide surface. Accordingly, when the diverting guide surface and the sliding guide surface are disposed at positions displaced from each other, it is possible to simplify the configuration for connecting these guide surfaces.

As an aspect, it is preferable that the article sorting apparatus further includes a passage sensor that detects that each of the article lateral pushing bodies has passed through the diverting mechanism, wherein the passage sensor is installed so as to detect the article lateral pushing bodies in the separation region.

With this configuration, by using the separation region located between the diverting mechanism and the sliding guide body, it is possible to set a detection position at which passage of each of the article lateral pushing bodies is detected by the passage sensor. Accordingly, it is possible to simplify the configuration for detecting passage of each of the article lateral pushing bodies, without separately forming a slit, a cut-out portion, or the like in the sliding guide body.

As an aspect, it is preferable that the article support body includes a plurality of plate-shaped support members fixed to an endless rotating body that circulates along the main transport direction, the plurality of plate-shaped support members are disposed so as to be arranged side by side along the main transport direction, and each of the plurality of article lateral pushing bodies is attached to the corresponding one of the plate-shaped support members so as to be slidingly movable in the width direction.

With this configuration, the article sorting apparatus according to the present disclosure can be preferably formed using a sliding shoe-type slat conveyor that is commonly and widely used.

It is sufficient that the article sorting apparatus according to the present disclosure can achieve at least one of the above-described effects.

What is claimed is:

1. An article sorting apparatus comprising:
    an article support body that forms a transport surface moving along a main transport direction, and that supports an article placed on the transport surface;
    a plurality of article lateral pushing bodies disposed so as to be arranged side by side along the main transport direction, each of the article lateral pushing bodies provided so as to be slidingly movable relative to the article support body in a width direction orthogonal to the main transport direction;
    a rectilinear-movement guide body that comprises a rectilinear-movement guide surface extending along the main transport direction, and that guides, with the rectilinear-movement guide surface, rectilinear movement of the article lateral pushing bodies along the main transport direction;
    a sliding guide body that comprises a sliding guide surface extending along an inclined transport direction inclined relative to the main transport direction, and that guides, with the sliding guide surface, the sliding movement of the article lateral pushing body; and
    a diverting mechanism disposed at a branching portion between a rectilinear-movement guide path formed by the rectilinear-movement guide body, and a slide guide path formed by the sliding guide body, and wherein the diverting mechanism diverts the article lateral pushing bodies to either a direction toward the rectilinear-movement guide path or a direction toward the slide guide path,
    wherein an upstream end portion of the sliding guide surface is disposed so as to be spaced apart, in the main transport direction across a separation region, from a downstream end portion of the diverting mechanism on the slide guide path side, and
    wherein the separation region comprises a contact start region that is a region in the main transport direction where each of the article lateral pushing bodies initially comes into contact with a target article that is the article to be sorted.

2. The article sorting apparatus according to claim 1, wherein:
    the article lateral pushing bodies each comprise a contact portion coming into contact with the target article, and a guided portion that is supported by the contact portion and is guided along the sliding guide surface, and
    the sliding guide surface is disposed such that the guided portion comes into contact with the sliding guide surface when the contact portion of each of the article lateral pushing bodies moves parallel to the main transport direction from a position at which the contact portion has initially come into contact with the target article.

3. The article sorting apparatus according to claim 2, wherein:
- the guided portion comprises a support shaft fixed to the contact portion, and a roller supported so as to be rotatable relative to the support shaft,
- the diverting mechanism includes a diverting guide surface that guides the support shaft, and
- the sliding guide surface is configured to guide the roller.

4. The article sorting apparatus according to claim 1, further comprising:
- a passage sensor that detects that each of the article lateral pushing bodies has passed through the diverting mechanism, and
- wherein the passage sensor is installed so as to detect the article lateral pushing bodies in the separation region.

5. The article sorting apparatus according to claim 1, wherein:
- the article support body comprises a plurality of plate-shaped support members fixed to an endless rotating body that circulates along the main transport direction,
- the plurality of plate-shaped support members are disposed so as to be arranged side by side along the main transport direction, and
- each of the plurality of article lateral pushing bodies is attached to the corresponding one of the plate-shaped support members so as to be slidingly movable in the width direction.

\* \* \* \* \*